United States Patent [19]
Collins

[11] Patent Number: 5,662,298
[45] Date of Patent: Sep. 2, 1997

[54] CAM LOCK TABLE SUPPORT APPARATUS

[76] Inventor: Harold O. Collins, 7551 E. North La., Scottsdale, Ariz. 85258

[21] Appl. No.: 564,780

[22] Filed: Nov. 29, 1995

[51] Int. Cl.[6] ............................................. F16M 11/20
[52] U.S. Cl. ............... 248/188.1; 248/439; 248/440.1; 108/125
[58] Field of Search ........................ 248/188.1, 188.6, 248/439, 166, 440.1, 220.21, 214, 207, 200.1; 108/125, 126, 130, 131; 403/374, DIG. 8, 320

[56] References Cited

U.S. PATENT DOCUMENTS

| | | | |
|---|---|---|---|
| 1,600,823 | 8/1926 | Hess | 182/151 |
| 2,221,932 | 11/1940 | Utley | 248/439 |
| 2,271,332 | 1/1942 | Ellington | 248/439 |
| 3,017,153 | 1/1962 | Johnson | 248/188 |
| 3,599,751 | 8/1971 | Mueller | 182/155 |
| 4,442,779 | 4/1984 | Bastan et al. | 108/125 |
| 4,645,161 | 2/1987 | Collins | 248/439 |
| 5,015,117 | 5/1991 | Pawlicki | 403/374 |

*Primary Examiner*—Leslie A. Braun
*Assistant Examiner*—Kimberly T. Wood
*Attorney, Agent, or Firm*—H. Gordon Shields

[57] ABSTRACT

Support apparatus includes a pair of folding leg elements pivotally secured to a longitudinal beam assembly. The beam assembly includes two beams longitudinally aligned with each other and secured by a U-shaped clamp. The leg elements are secured to the center, longitudinally extending beams by a pair of cam lock units, secured to the leg units. The cam lock units pivot and are lockable to the beam in both the open, support position and in the folded, storage position. The use of the two beam elements and the U-shaped channel connector allows the beam elements to twist relative to each other, and the twisting allows the leg elements to remain stable while disposed on an uneven surface.

13 Claims, 3 Drawing Sheets

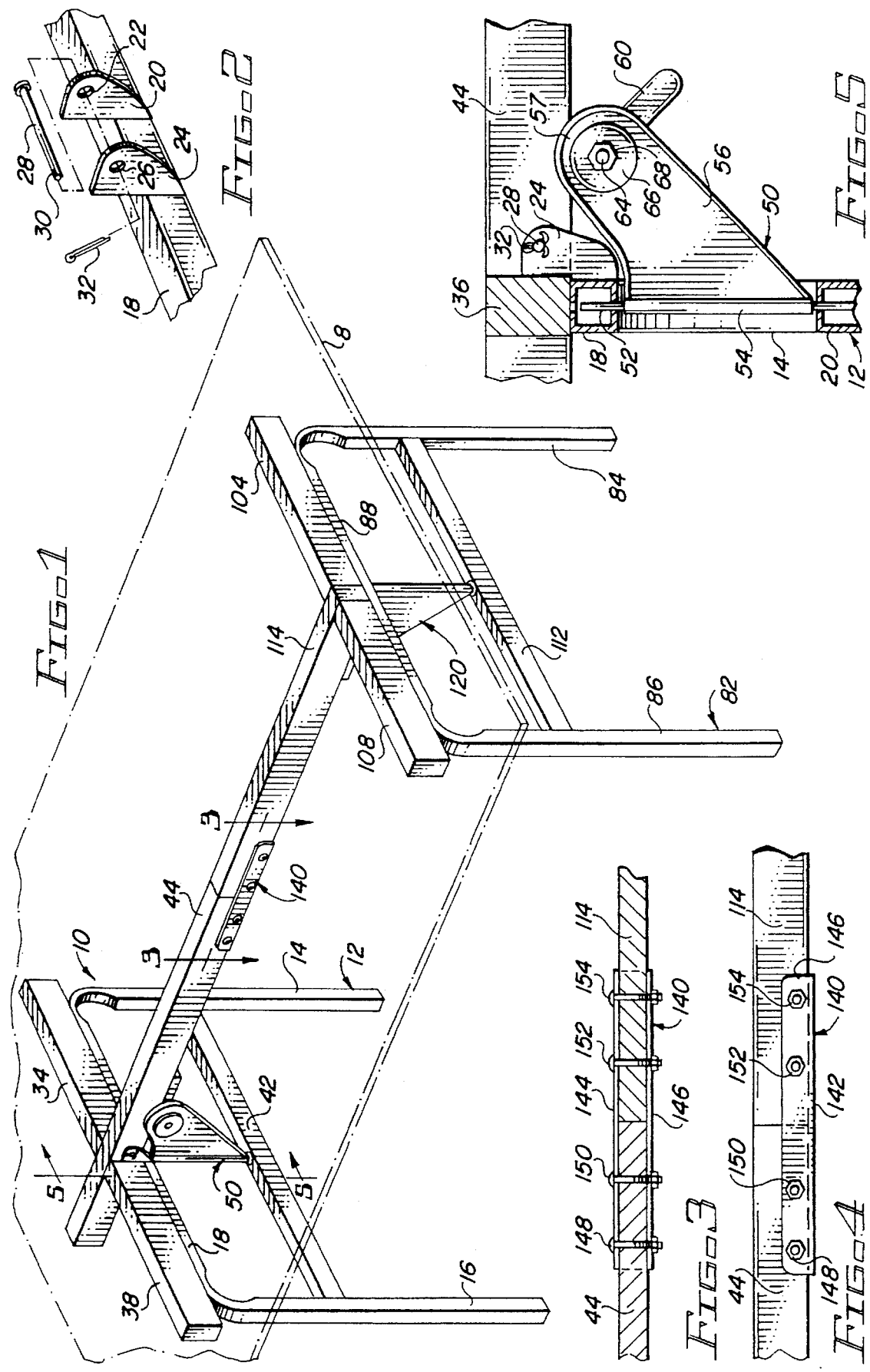

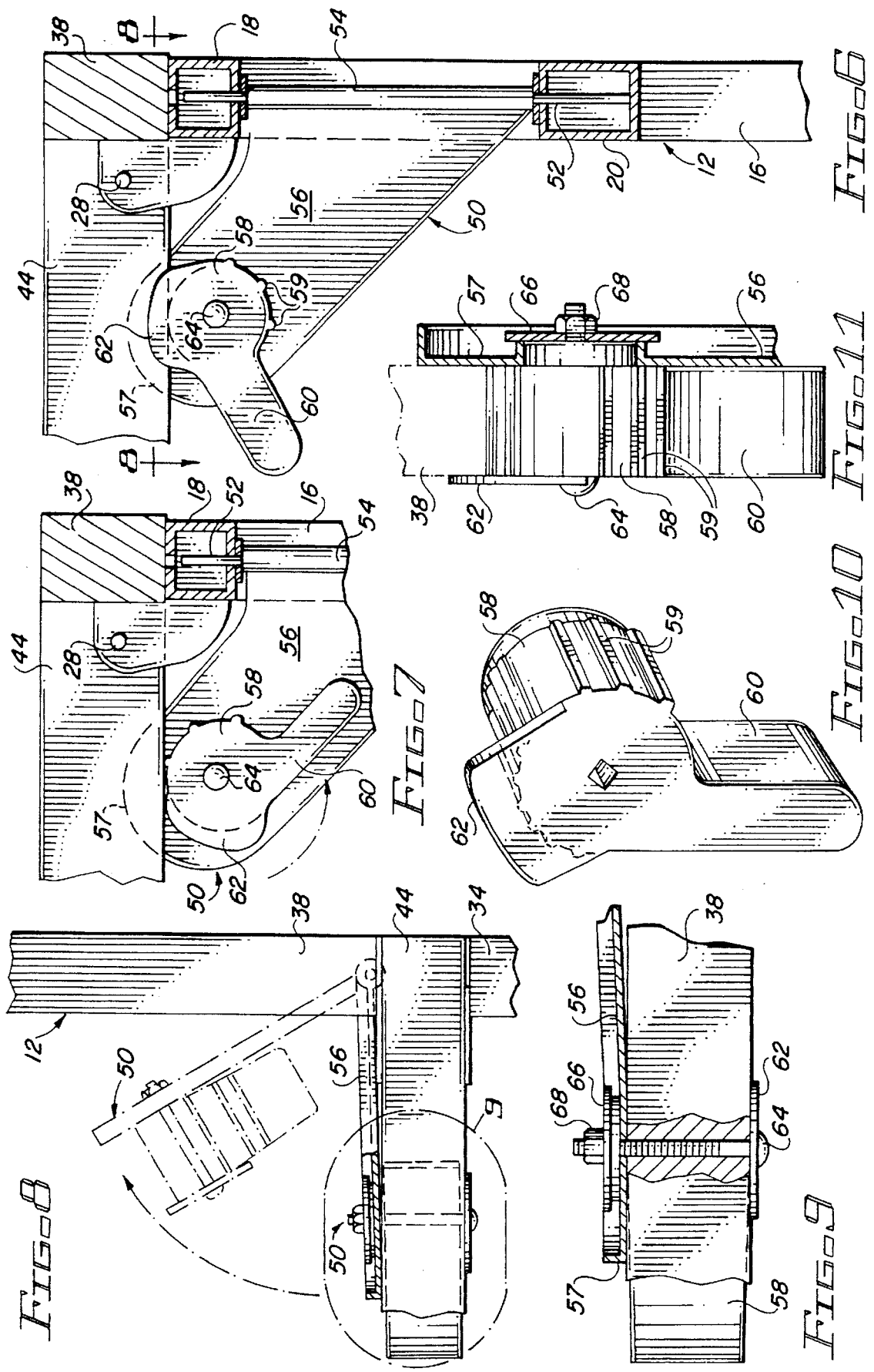

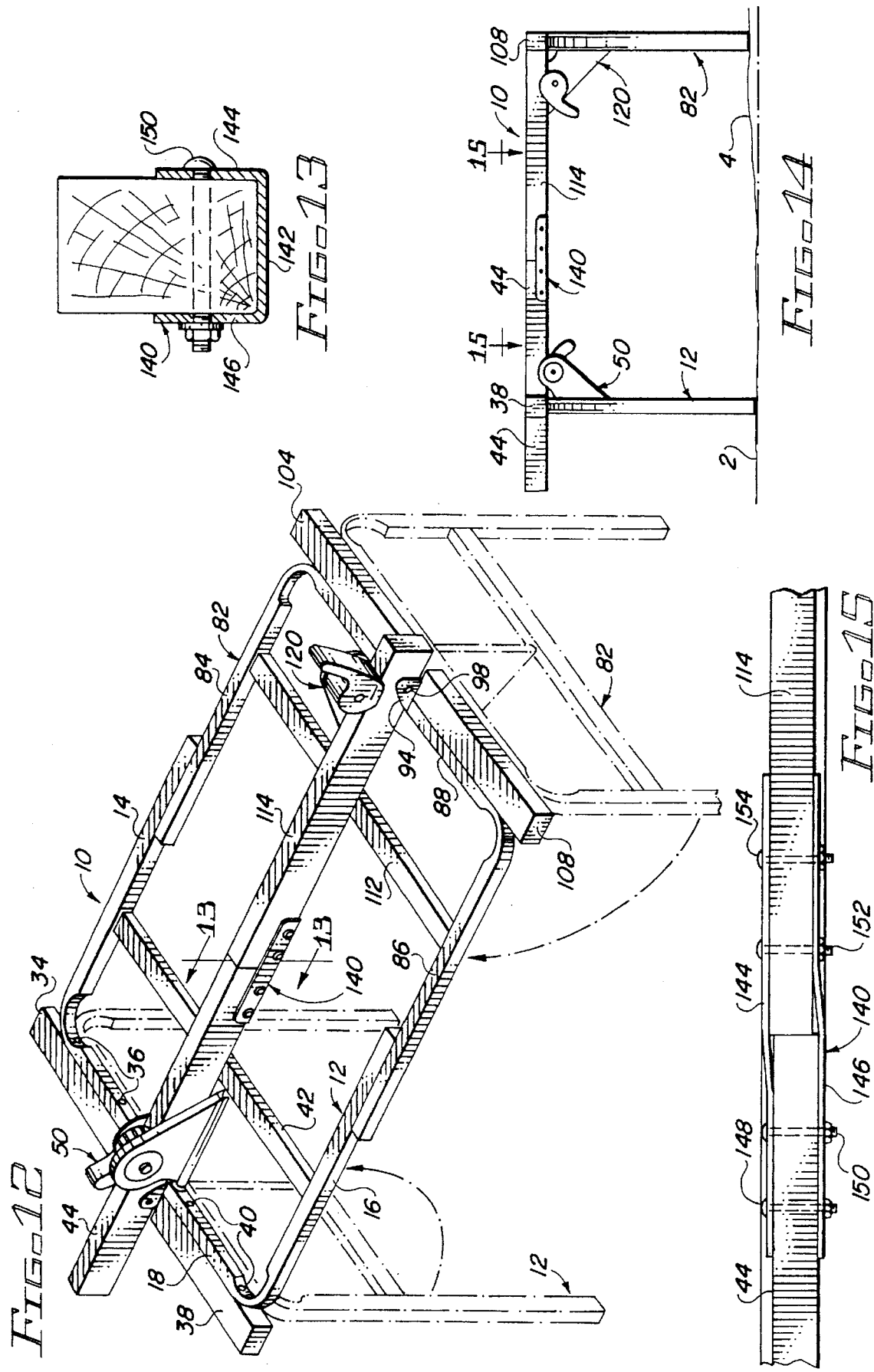

CAM LOCK TABLE SUPPORT APPARATUS

BACKGROUND OF THE INVENTION

1. Field of the invention

This invention relates to support apparatus and, more particularly, to a foldable support apparatus which locks in both an open and in a closed position by cam elements.

2. Description of the Prior Art

U.S. Pat. No. 4,645,161, the inventor of which is the inventor herein, comprises a first generation support apparatus for providing a stable work supporting surface. The apparatus includes a pair of leg elements spaced apart and secured to a longitudinally extending beam element. The support legs are movable along the beam. That is, the leg elements may be moved along the beam to position the leg elements closer to each other or further apart, as desired.

The '161 patent comprises a first generation apparatus, while the apparatus of the present invention comprises a second generation apparatus.

SUMMARY OF THE INVENTION

The invention described and claimed herein comprises a pair of leg units. A longitudinal unit extends between the two leg units. The longitudinal unit includes a pair of beams aligned with each other and secured together by a channel element. The leg elements are locked to the longitudinal beam element by cam locks which are secured to the leg units. The cam locks, when released, are pivotable relative to the beam to allow the leg units to pivot relative to the beam. The cam lock elements may then be secured again to the longitudinal beam to hold the legs in the folded position relative to the beam.

Among the objects of the present invention are the following:

To provide new and useful support apparatus;

To provide new and useful support apparatus including a pair of leg units secured to a longitudinally extending beam;

To provide new and useful leg units securable to a beam by a cam lock;

To provide new and useful folding leg elements lockable in a down position by a cam and lockable in a folded or storage position by a same cam.

BRIEF DESCRIPTION OF THE DRAWING

FIG. 1 is a perspective view of the apparatus of the present invention.

FIG. 2 is a perspective view of a portion of the apparatus of the present invention.

FIG. 3 is a view in partial section taken generally along line 3—3 of FIG. 1.

FIG. 4 is a side view of the elements shown in FIG. 3.

FIG. 5 is a view in partial section taken generally along line 5—5 of FIG. 1.

FIG. 6 is a view in partial section of a portion of the apparatus of the present invention, and comprising a rear view of the elements illustrated in FIG. 3.

FIG. 7 is a view sequentially following FIG. 6 illustrating the operation of the elements illustrated in FIG. 6.

FIG. 8 is a view taken generally along line 8—8 of FIG. 6.

FIG. 9 is an enlarged view taken generally from oval 9 of FIG. 8.

FIG. 10 is a perspective view of a portion of the apparatus of the present invention.

FIG. 11 is an end view of the element of FIG. 10.

FIG. 12 is a perspective view of the apparatus of the present invention illustrating the folding of the apparatus.

FIG. 13 is a view in partial section taken generally along line 13—13 of FIG. 12.

FIG. 14 is a side view of the apparatus of the present invention showing the apparatus disposed on an uneven surface.

FIG. 15 is a view taken generally along line 15—15 of FIG. 14.

DESCRIPTION OF THE PREFERRED EMBODIMENT

FIG. 1 is a perspective view of support apparatus of the present invention. The support apparatus includes a pair of leg units 12 and 82 spaced apart from each other and connected by a pair of longitudinally extending beam elements 44 and 114. The leg units or leg assemblies 12 and 82 are substantially identical to each other, and are spaced apart from each other and face each other. The leg unit or leg assembly 12 includes a pair of generally parallel legs 14 and 16 spaced apart from each other. The legs 14 and 16 are connected by a top cross piece 18. Disposed on the top of the cross piece 18 are support slats 34 and 38. The slats 34 and 38 are secured to the cross piece by screws, as best shown in FIG. 12. A pair of screws 36 secure the slat 34 to the cross piece 18, and a pair of screws 40 are used to secure the slat 8 to the cross piece 18.

A cross brace 42 extends between and is appropriately secured to the legs 14 and 16. The brace 42 is generally parallel to the top cross piece 18. The cross brace 42 is spaced apart downwardly from a top cross piece 18. A cam lock unit 50 is disposed between the generally parallel elements 18 and 42. The cam unit 50 will be discussed in detail in conjunction with FIGS. 5–11.

The leg unit 82, as indicated above, is substantially identical to the leg unit or leg assembly 12. The leg unit or leg assembly 82 includes a pair of generally parallel legs 84 and 86 joined together by a top cross piece 88. The legs 84 and 86 are generally parallel to each other. A cross brace 112 is disposed below and generally parallel to the top cross piece 88. The cross brace 112 is appropriately secured to the legs 84 and 86.

A cam lock unit or cam lock assembly 120 is disposed between the elements 88 and 112. The cam unit or assembly 120 is substantially identical to the cam lock unit or cam lock assembly 150.

On the top of the cross piece 88 are two laterally extending slats 104 and 108. The slats 104 and 108 are appropriately secured to the cross piece 88 by screws, not shown, in substantially the same manner as the slats 34 and 38 are secured to the cross piece 18.

The slats 34 and 38 are spaced apart from each other, as are the boards 104 and 108. The longitudinally extending beam elements 44 and 114 are disposed between the boards 34, 38 and 104, 108, respectively. The top surfaces of the lateral slats 34 and 38 are generally flush with the top surface of the beam 44, and are appropriately aligned with the top surfaces of the slats 104, 108, and 114. The beams 44 and 114 comprise aligned, longitudinally extending elements which are secured together by a channel element 140.

The beams 44 and 114 are secured to the leg units or leg assemblies 12 and 82 substantially identically. Accordingly, only the beam 44 will be discussed in detail. FIG. 2 comprises a perspective view of a portion of the cross piece 18, showing a pair of spaced apart flanges 20 and 24 which are secured to the cross piece 18. The beam 44 is disposed between the flanges 20 and 24, and the beam 44 is secured to the leg assembly 12 by means of the flanges 20 and 24.

The flange 20 includes an aperture 22 extending through it, and the flange 24 includes an aperture 26 extending through it. As may be seen from FIGS. 1 and 5, the beam 44 is disposed on the top of the cross piece 18 and between the beam elements 34 and 38 and between the flanges 20 and 24. A pin 28 extends through the aligned apertures 22 and 26, and through a hole in the beam 44 disposed between the flanges. The pin 28 includes a diametrically extending hole 30, and a cotter pin 32 extends through the hole 30 to secure the pin to the beam 44 and to the flanges 22 and 24.

The beam 114 is similarly secured to the cross piece 88. The cross piece 88 includes a pair of flanges, of which a flange 94 is shown in FIG. 12. A pin 98 extends through the flange 94, the beam 114, and another flange (not shown).

The securing together of the longitudinally extending beam elements 44 and 114 is illustrated in conjunction with FIGS. 3 and 4. FIG. 3 comprises a view in partial section taken generally along line 3—3 of FIG. 1, and FIG. 4 is a side view of the elements shown in FIG. 3.

The channel element 140 is also illustrated in conjunction with FIG. 13. FIG. 13 comprises a view in partial section through the channel 140 taken generally along line 13—13 of FIG. 12. For the following discussion, reference will primarily be made to FIGS. 3, 4, and 13.

The channel element 140 has a generally U-shaped cross-sectional configuration. It includes a bottom web 142 and a pair of upwardly extending flanges 144 and 146. Four bolt and nut assemblies extend through the channel element 140 and through the beam elements 144 and 114, with two bolt and nut assemblies extending through each of the beams 44 and 114. In FIGS. 3 and 4, bolt and nut assemblies 148 and 150 are shown extending through the beam 44 to secure the beam 44 to the channel 140, and bolt and nut assemblies 152 and 154 are shown extending through the beam 114 to secure the beam 114 to the channel element 140. The inner ends of the beams 44 and 114, remote from the leg assemblies 12 and 82, respectively, are shown in an abutting relationship in FIGS. 3 and 4.

With the longitudinally extending beams 44 and 114 secured to the leg assemblies 12 and 82, respectively, through the pin arrangements, as discussed above, primarily in conjunction with FIG. 2, but also as shown in FIGS. 1, 5, and 12, the leg assemblies will pivot relative to the longitudinally extending beams 44 and 114, using the pins 28 and 98, respectively, as pivot elements.

The leg assemblies are secured to the longitudinal beam elements in both the down, use orientation as illustrated in FIG. 1, and in the folded or storage configuration, as illustrated in FIG. 12. FIG. 12 comprises a perspective view of the support apparatus 10 illustrating the folding or pivoting of the leg assemblies 12 and 82, relative to the longitudinally extending beam elements 44 and 114. The locking of the leg assemblies to the longitudinal beams is illustrated best in conjunction with FIGS. 5–11.

FIG. 5 comprises a view in partial section taken generally along line 5—5 of FIG. 1. The cam lock unit or cam lock assembly 50 is shown in side view in FIG. 5. FIG. 6 is another view of the cam assembly 50, taken from the opposite side of the cam assembly 50 from that shown in FIG. 5. FIG. 7 is a view illustrating the operation of the cam assembly 50 sequentially following that illustrated in FIG. 6.

FIG. 8 is a top view showing the pivoting of the cam assembly 50 relative to the leg assembly 12 and to the longitudinally extending beam 44 to allow for the pivoting of the leg assembly 12 relative to the board 44.

FIG. 9 comprises an enlarged view of a portion of the apparatus of FIG. 8 taken generally from oval 9 of FIG. 8. FIG. 10 comprises a perspective view of a portion of the cam unit 50, and FIG. 11 is a top view of a portion of a cam unit.

For the following discussion, reference will primarily be made to FIGS. 5–11.

As indicated above, the cam lock units 50 and 120 are substantially identical, and accordingly, only the cam unit 50 will be discussed in detail.

The cam lock unit 50 includes a pin 52 which is disposed between the transverse elements 18 and 20. The pin 52 comprises a hinge pin on which the cam assembly pivots. The hinge pin 52 extends through a cylindrical element 54. A generally triangularly shaped web or panel 56 extends outwardly from the cylindrical element 54. The web or panel element 56 extends outwardly and upwardly. The panel 56 terminates in a generally rounded upper portion 57 which is disposed along side the beam 44 when the cam unit 50 is secured to the beam 44. The cam units may be made of any appropriate material. The panel 56 is appropriately flanged for increased strength.

A cam roller or drum 58 is secured to the panel 56 adjacent to the upper portion 57. The cam roller or drum 58 includes a plurality of transversely extending ribs 59 which help to frictionally engage the beam 44 to lock the beam 44 in place relative to the leg assembly 12.

Extending outwardly from the cam roller or drum 58 is a handle 60. The handle 60 extends from one side of the drum 58 in a semi-tangential configuration.

The flange 62 extends upwardly from one side of the handle 60 and upwardly from the cam roller or drum 58. In the use position, when the cam unit 50 is secured to the longitudinally extending beam 44, the flange 62 is generally parallel to the upper portion 57 of the panel 56. Thus, the upper portion 57 of the web 56 and the flange 62 are in an abutting relationship, and appropriately aligned, with the board 44. The flange 62 is illustrated as having a small, outwardly extending flange for increased strength, similar to that of the panel 56.

The cam roller or drum pivots on a bolt 64 which extends through the drum 58 and through the web 56. A washer 66 and a nut 68 are used to secure the bolt 64 to the cam roller drum 58 and to the panel 56.

The pivoting of the drum 58 is slightly eccentric. This is best shown sequentially in FIGS. 6 and 7. In FIG. 6, the drum or cam roller 58 is shown in the locked position, secured to the longitudinal beam 44. In FIG. 7, the handle 60 is shown moved in a counterclockwise direction from that shown in FIG. 6 to unlock the cam unit 50 by moving the roller 58, and the flange 62, away from the beam 44. This allows the cam lock unit 50 to pivot away from the beam 44. The movement of the cam unit 50 is shown in phantom in FIG. 8. FIG. 8 thus sequentially follows FIG. 7 in showing the pivoting of the cam unit 50 to allow the leg unit 12 to pivot relative to the longitudinal beam 44. This allows the leg unit 12 to pivot on the pin 28.

In FIG. 6, the cam roller or drum 58 is shown disposed against the bottom surface of the beam 44 to lock the leg unit 12 against the beam 44 through the cam lock unit 50. In FIG. 7, the handle 60 of the cam lock unit 50 is shown rotated counterclockwise, and the counterclockwise rotation moves the top or lock surface of the drum 58, and the flange 62, away from the beam 44. This movement unlocks the unit 50 from the beam 44. The unlocking occurs because of the eccentric disposition of the roller 58. That is, the radius of the roller 58 from its center of rotation on the bolt 64 changes from a maximum when the roller is disposed against the beam 44 in the locked position, as shown in FIG. 6, to a minimum when the roller is away from the beam, as shown in FIG. 7, in the unlocked position.

FIG. 12, as indicated above, comprises a perspective view of the support apparatus 10 showing the pivoting of the leg unit 12 and 82 relative to the longitudinal beam elements 44 and 114.

FIG. 12 also shows the location of the cam units 50 and 120 relative to the longitudinal beam members 44 and 114. The cam units 50 and 120 are on opposite sides of the elements 44 and 114, and thus pivot in opposite directions. FIG. 12 also shows the offset relationship of the leg units 12 and 82 to allow the folding of the leg units without interference between the respective legs.

In FIG. 12, the cam units 50 and 120 are shown locked to their respective members 44 and 114. Thus, the cam units lock to the undersides or bottom surfaces and to the top side of the longitudinal beam members. The locking of the cam units secures the apparatus in the open, use, position or orientation and in the folded, storage position or orientation.

A cam roller is simply rotated to its unlocked position or orientation, and the cam unit is then pivoted on its pivot pin away from the longitudinal beam member. The folding or unfolding of the leg unit is then accomplished. The cam unit then pivots back and the cam roller is rotated by its handle to lock the cam unit to the longitudinal member.

As indicated above, the eccentric movement of the outer surface of the roller or drum 58, and its corresponding element in the cam lock unit 120, allows the locking and unlocking of the leg units to and from the beam members. The drums may be locked to the undersides or bottom surfaces of the beams, as shown in FIG. 1, to lock the apparatus 10 in its use orientation. The drums may also be locked to the top surfaces of the beams, as shown in FIG. 12, to lock the apparatus 10 in its folded, storage orientation.

A unique feature of the apparatus 10, by using two aligned beam members 44 and 114 held together by the channel element 140, is illustrated in FIGS. 14 and 15. In FIG. 14, the leg units 12 and 82 are shown disposed on uneven surfaces, with the leg unit 12 shown disposed on a relatively flat surface 2 while the leg unit 82 is disposed on an uneven rise or surface 4. However, even under such conditions, the support structure 12 will maintain its stability because the longitudinal beam members 44 and 114 are allowed to twist relative to each other. The twisting is shown in FIG. 15.

FIG. 15 comprises a top view, somewhat exaggerated for illustrative purposes, showing the twisting of the members 44 and 114 and the channel element 140. The members 44 and 114 are twisted relative to each other. The inherent flexibility of the channel member 140 allows the twisting to take place. The twisting allows the leg units 12 and 82 to maintain their stability without rocking, and accordingly to support an element 8, shown in FIG. 1 on the top surfaces of the elements 34, 38, 44, 104, 108, and 114. The element 8 may be a large board, a door, a sheet of plywood, or any desired element to be worked on or supported.

The use of the pins to secure the beams 44 and 114 to the leg units or leg assemblies provides a degree of loosening or slack that also allows the beams to twist a certain amount, although the amount is slight. The twisting of the beams at the leg units helps to provide the stability for the apparatus on uneven surfaces.

If a single longitudinal beam were used in place of the two beams 44 and 114 and the connective channel element 140, there may be a slight amount of twisting, but the stability provided by the two beams and the connective channel would not be present. Some degree of stability may be present with a single beam, but not the degree of stability provided by the double connected beam.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What is claim is:

1. Support apparatus comprising in combination:
   a first leg assembly, including
      a first pair of legs generally parallel to each other and spaced apart from each other, and
      a first cross piece secured to and disposed between the first pair of legs;
   a first beam pivotally secured to the first cross piece;
   a first cam lock assembly, including
      a first panel pivotally secured to the first leg assembly,
      a first cam roller eccentrically rotatable on the first panel, whereby the first cam roller is disposed against the first beam and is rotated on the first panel to a locked position to lock the first beam to the first leg assembly and is rotated to an unlocked position to allow the first panel and the first cam roller to pivot away from the first beam to allow the first leg assembly to pivot relative to the first beam;
   a second leg assembly, including
      a second pair of legs generally parallel to each other and spaced apart from each other, and
      a second cross piece secured to and disposed between the first pair of legs;
   a second beam pivotally secured to the second cross piece;
   a second cam lock assembly, including
      a second panel secured to the second leg assembly,
      a second cam roller eccentrically rotatable on the second panel, whereby the second cam roller is disposed against the second beam and is rotated on the second panel to a locked position to lock the second beam to the second leg assembly and is rotated to an unlocked position to allow the second panel and the second cam roller to pivot away from the second beam to allow the second leg assembly to pivot relative to the second beam; and
   means for securing the first and second beams together.

2. The apparatus of claim 1 in which the means for securing the first and second beams together includes a channel element.

3. The apparatus of claim 1 which further includes first and second handles secured respectively to the first and second cam rollers for rotating the cam rollers to their respective locked and unlocked positions.

4. The apparatus of claim 1 which further includes a first pair of slats secured to the first cross piece, and the first beam is disposed between the slats of the first pair of slats.

5. The apparatus of claim 4 which further includes a second pair of slats secured to the second cross piece, and the second beam is disposed between the slats of the second pair of slats.

6. Support apparatus comprising in combination:

a first leg assembly;

a second leg assembly spaced apart from the first leg assembly;

beam means extending between and pivotally secured to the first and second leg assemblies for supporting, with the leg assemblies, an element disposed thereon;

first cam lock means pivotally secured to the first leg assembly, and including a first cam roller to be disposed against the beam means to lock the first leg assembly to the beam means in a first orientation and movable away from the beam means to allow the first cam lock means to pivot away from the beam means to allow the first leg assembly to pivot relative to the beam means to a second orientation, and then to allow the first cam lock means to pivot to the beam means to allow the first cam roller to be disposed against the beam means to lock the first leg assembly to the beam means in the second orientation;

second cam lock means pivotally secured to the second leg assembly, and including a second cam roller to be disposed against the beam means to lock the second leg assembly to the beam means in a first orientation and movable away from the beam means to allow the second cam lock means to pivot away from the beam means to allow the second leg assembly to pivot relative to the beam means to a second orientation, and then allow the second cam lock means to pivot to the beam means to allow the second cam roller to be disposed against the beam means to lock the second leg assembly to the beam means in the second orientation.

7. The apparatus of claim 6 in which the first cam lock means further includes a handle secured to the first cam roller for rotating the cam roller.

8. The apparatus of claim 7 in which the first cam lock means further includes a first panel pivotally secured to the first leg assembly, and the first cam roller rotates on the first panel.

9. The apparatus of claim 8 in which the second cam lock means further includes a second panel pivotally secured to the second leg assembly, and the second cam roller rotates on the second panel.

10. The apparatus of claim 9 in which the first and second cam rollers are eccentrically rotatable on their respective first and second panels to move the cam rollers against the beam means to lock the beam means to the respective first and second leg assemblies to allow the first and second cam lock means to pivot away from the beam means to allow the leg assemblies to pivot relative to the beam means.

11. The apparatus of claim 6 in which the beam means includes a first beam pivotally secured to the first leg assembly and a second beam pivotally secured to the second leg assembly and to the first beam.

12. The apparatus of claim 6 in which the first leg assembly includes a first pair of legs spaced apart from each other and a first crosspiece extending between and secured to the first pair of legs, and the beam means is pivotally secured to the first crosspiece.

13. The apparatus of claim 12 in which the second leg assembly includes a second pair of legs spaced apart from each other and a second cross piece extending between and secured to the second pair of legs, and the beam means is pivotally secured to the second cross piece.

* * * * *